US 9,176,889 B1

(12) United States Patent
Earhart, III

(10) Patent No.: US 9,176,889 B1
(45) Date of Patent: Nov. 3, 2015

(54) VIRTUAL MACHINE MEMORY MANAGEMENT

(71) Applicant: GOOGLE INC., Mountain View, CA (US)

(72) Inventor: Robert H. Earhart, III, Seattle, WA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 13/837,303

(22) Filed: Mar. 15, 2013

(51) Int. Cl.
| | |
|---|---|
| *G06F 13/00* | (2006.01) |
| *G06F 12/10* | (2006.01) |
| *G06F 12/08* | (2006.01) |
| *G06F 13/16* | (2006.01) |
| *G06F 13/38* | (2006.01) |
| *G06F 3/06* | (2006.01) |

(52) U.S. Cl.
CPC .............. *G06F 12/10* (2013.01); *G06F 3/0628* (2013.01); *G06F 3/0653* (2013.01); *G06F 3/0662* (2013.01); *G06F 12/0871* (2013.01); *G06F 12/0893* (2013.01); *G06F 12/109* (2013.01); *G06F 12/1036* (2013.01); *G06F 13/1673* (2013.01); *G06F 13/1689* (2013.01); *G06F 13/38* (2013.01); *G06F 13/385* (2013.01)

(58) Field of Classification Search
CPC . G06F 12/109; G06F 12/1036; G06F 3/0628; G06F 3/0653; G06F 3/0662; G06F 12/0871; G06F 12/0893; G06F 13/38; G06F 13/385; G06F 13/1673; G06F 13/1689
USPC ............. 711/6, 203, 210, 118, 143, 159, 165, 711/217; 707/831; 709/249, 229; 713/150, 713/189
See application file for complete search history.

(56) References Cited

U.S. PATENT DOCUMENTS

| | | | |
|---|---|---|---|
| 7,437,529 B2 | 10/2008 | Burugula et al. | |
| 8,131,972 B2 | 3/2012 | Burnett | |
| 8,291,135 B2 | 10/2012 | Subramanian et al. | |
| 8,392,623 B2 | 3/2013 | Subramanian et al. | |
| 8,417,913 B2 | 4/2013 | Elnohazy et al. | |
| 8,800,009 B1 * | 8/2014 | Beda et al. | 726/6 |
| 8,958,293 B1 * | 2/2015 | Anderson | 370/230 |
| 2005/0108496 A1 | 5/2005 | Elnohazy et al. | |
| 2011/0010515 A1 * | 1/2011 | Ranade | 711/162 |
| 2011/0179413 A1 | 7/2011 | Subramanian et al. | |
| 2011/0219447 A1 * | 9/2011 | Horovitz et al. | 726/22 |
| 2012/0221800 A1 | 8/2012 | Eidus et al. | |
| 2013/0159649 A1 * | 6/2013 | Sherwood et al. | 711/162 |
| 2013/0246685 A1 * | 9/2013 | Bhargava et al. | 711/6 |

FOREIGN PATENT DOCUMENTS

EP     0969380     1/2000

* cited by examiner

*Primary Examiner* — Reba I Elmore
(74) *Attorney, Agent, or Firm* — Fish & Richardson P.C.

(57) ABSTRACT

Methods, systems, and apparatus, including computer programs encoded on computer storage media, for determining image search results. One of the methods includes receiving a notification that contents of a first memory page for a first virtual machine on a first host machine are the same as contents of a second memory page for a second virtual machine on a second different host machine. Storage space occupied by the first memory page on the first host machine is deallocated based on the notification. A request from the first virtual machine for the first memory page is received. In response to the request, a copy of contents of the second memory page is obtained from the second host machine.

25 Claims, 5 Drawing Sheets

VIRTUAL MACHINE MEMORY MANAGEMENT

BACKGROUND

This specification relates to cloud computing and, in particular, to virtual machine memory management.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

Virtual machines in a datacenter commonly have guest physical memory pages whose contents are identical to the contents of other guest physical memory pages in use by the same or other virtual machines in the datacenter. Rather than maintaining a separate copy of the contents of these guest physical memory pages for each guest physical memory page, the guest physical memory pages whose contents are the same can be coalesced, such that the datacenter as a whole maintains fewer copies of the contents of these guest physical memory pages. A virtual machine monitor can request copies of a coalesced page as needed, typically when accessed by the software running within the virtual machine, or in anticipation of such access.

In general, one innovative aspect of the subject matter described in this specification can be embodied in methods that include the actions of receiving a notification that contents of a first memory page for a first virtual machine on a first host machine are the same as contents of a second memory page for a second virtual machine on a second different host machine, wherein a memory page is a segment of computer-executable instructions or data; deallocating storage space occupied by the first memory page on the first host machine based on the notification; receiving a request from the first virtual machine for the first memory page; and in response to the request, obtaining a copy of contents of the second memory page from the second host machine. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The first memory page and the second memory page are guest physical memory pages. Receiving the notification comprises receiving the notification from a service that manages virtual machine memory pages in a datacenter. The actions include receiving an identification of the second host machine, and wherein obtaining a copy of contents of the second memory page from the second host machine comprises requesting the copy from the second host machine based on the identification. The actions include in response to obtaining a copy of the second memory page, loading the second memory page into random access memory. The actions include providing a notification to a virtual machine monitor that the second memory page is available for access. The actions include computing usage statistics for one or more virtual machine memory pages used by one or more virtual machines on the first host machine; and identifying one or more virtual machine memory pages with usage that is less than a threshold based at least in part on the computed usage statistics. The actions include receiving a request for usage statistics on one or more virtual machine memory pages; and providing usage statistics for the identified one or more virtual machine memory pages in response to the request.

In general, another innovative aspect of the subject matter described in this specification can be embodied in methods that include the actions of determining that multiple memory pages whose contents are the same are used by multiple different virtual machines, wherein each of the virtual machines executes on a different respective host machine in a datacenter; storing, on a first host machine, contents of a memory page from one of the multiple memory pages whose contents are the same; receiving a request for the stored memory page from a second host machine; and providing information identifying a datacenter location of the first host machine to the second host machine in response to on the request. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include computing usage statistics for virtual machine memory pages used by one or more virtual machines in a datacenter; and determining that the multiple memory pages whose contents are the same each have a usage statistic that satisfies a threshold. The actions include providing a notification to each of the one or more host machines that the respective one or more memory pages can be deallocated. The actions include storing multiple copies of the contents of the memory page, wherein each copy of the multiple copies is maintained on a different host machine.

Particular embodiments of the subject matter described in this specification can be implemented so as to realize one or more of the following advantages. Coalescing guest physical memory pages across host machines allows a datacenter to store fewer copies of guest physical memory pages whose contents are the same. The number of copies of the contents of guest physical memory pages stored across the datacenter may be fewer than the number of physical host machines with virtual machines using those guest physical memory. The storage space savings from coalescing virtual memory pages can additionally allow more virtual machines or non-virtual workloads to be loaded onto host machines in the datacenter.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
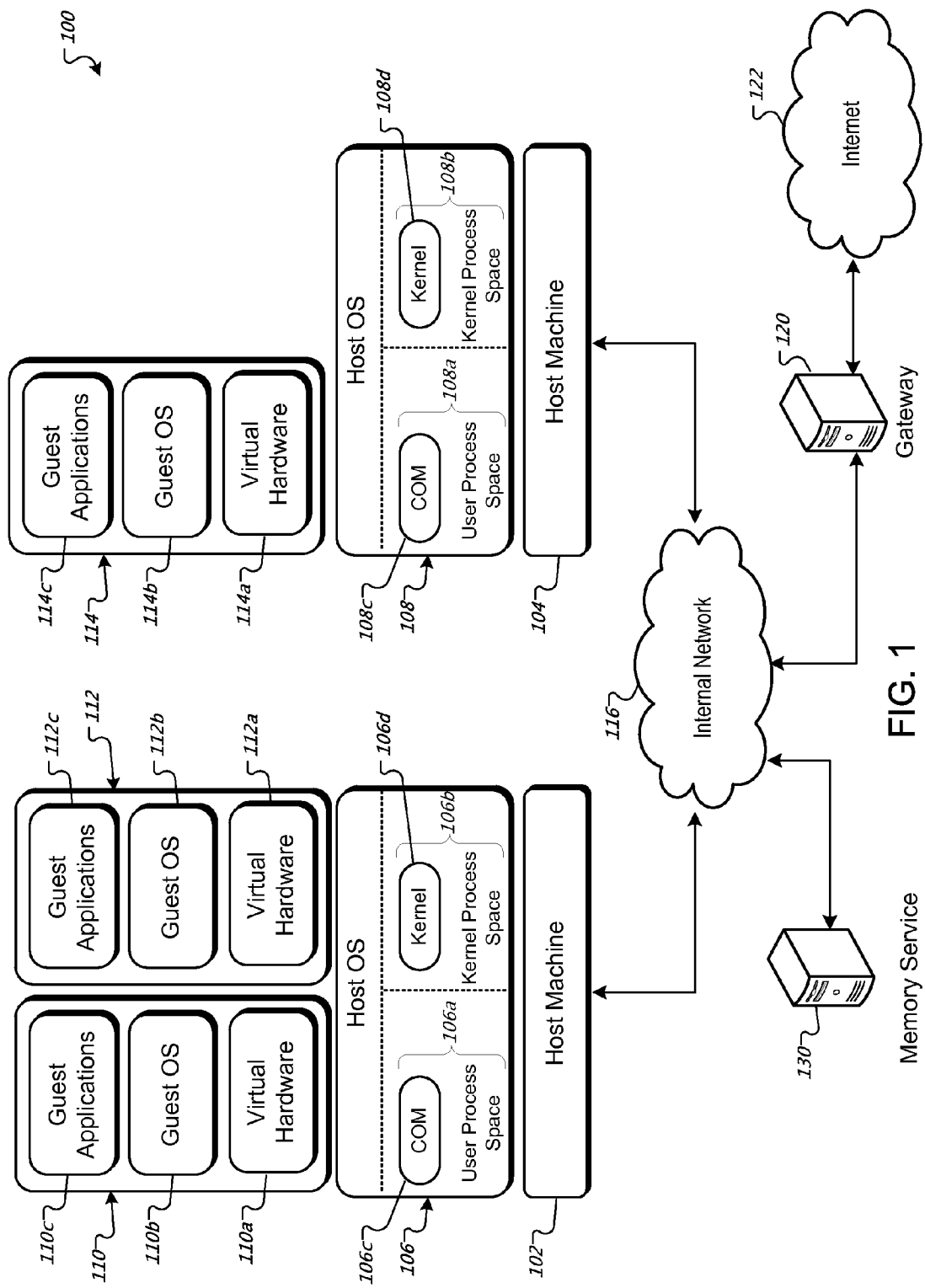
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network 116 can include one or more wired, e.g., Ethernet, or wireless, e.g., WI-FI, networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine 102, 104 executes a host operating system 106, 108. A host operating system 106, 108 manages host machine resources. In this example, host operating systems 106, 108 run software, e.g. a virtual machine monitor (VMM) or a hypervisor, that virtualizes the underlying host machine hardware and manages concurrent execution of one or more VMs. In this example, the host operating system 106 manages two VMs, VM 110 and VM 112, while a different host operating system 108 manages a single VM 114. VMs can be migrated from one host machine to another host machine. In addition, a single VM can be managed by multiple host machines. A host machine can, in general, manage multiple virtual machines, however, the quantity may be limited based on physical resources of the host machine.

Each VM provides an emulation of a physical hardware system which may, but need not, be based on the host machine hardware architecture. The simulated version of the hardware is referred to as virtual hardware, e.g., virtual hardware 110a, 112a, and 114a. Software that is executed by the virtual hardware is referred to as guest software. In some implementations, guest software cannot determine if it is being executed by virtual hardware or by a physical host machine. If guest software executing in a VM, or the VM itself, is compromised, malfunctions, or aborts, other VMs executing on the host machine may not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

As part of the simulated hardware, each VM, e.g., VMs 110, 112, and 114, has access to some amount of guest physical memory. The VMM may implement this guest physical memory in various ways, for example, by mapping pages of guest physical memory to pages of host physical memory, by simulating pages of guest physical memory, or by dynamically loading contents of guest physical memory from a storage device. Each VM also has access to virtual storage hardware, for example virtual disk blocks from one or more virtual disk drives for use by the guest software executing on the VM. A virtual memory page can store a segment of computer-executable instructions, data, or both. The contents of a memory page can be read from computer-readable storage, loaded into random access memory, and in some instances executed by the VM. For example, host operating system 106 allocates memory pages and disk blocks to VM 110 and VM 112, and host operating system 108 allocates memory pages and disk blocks to VM 114. In some implementations, a given VM cannot access the guest physical virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, may be visible on the Internet 122 if the addresses are advertised using a suitable routing protocol, for instance.

A VM's guest software can include a guest operating system, e.g., guest operating systems 110b, 112b, and 114b, which is software that controls the execution of respective guest software applications, e.g., guest applications 110c, 112c, and 114c, within the VM and provides services to those applications. For example, a guest operating system could be a version of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges, sometimes referred to as "supervisor mode"; that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process, e.g., communication process 106c. In some implementations, the communication process executes in the user process space, e.g., user process space 106a, of a host operating system, e.g., host operating system 106. In other implementations, the communication process can execute in the kernel process space, e.g., kernel process space 106d of the host operating system. In yet further implementations, some portion of the communication process executes in the user process space and another portion executes in the kernel process space.

The system 100 includes a memory service 130. The memory service 130 is a process that can manage and maintain information about memory pages in the system 100. For example, the memory service 130 can determine that multiple VMs in the system 100 are maintaining guest physical memory pages whose contents are the same. In other words, the guest physical memory pages are storing the same bytes, which are encoding instructions, data, or both. In response, the memory service 130 can instead maintain the contents of a single guest physical memory page that corresponds to the guest physical memory pages that are common to all of the multiple VMs. In response, the multiple VMs can deallocate storage space, e.g. hard disk space or RAM, that was previously allocated to maintaining the guest physical memory page.

Figure 2A:
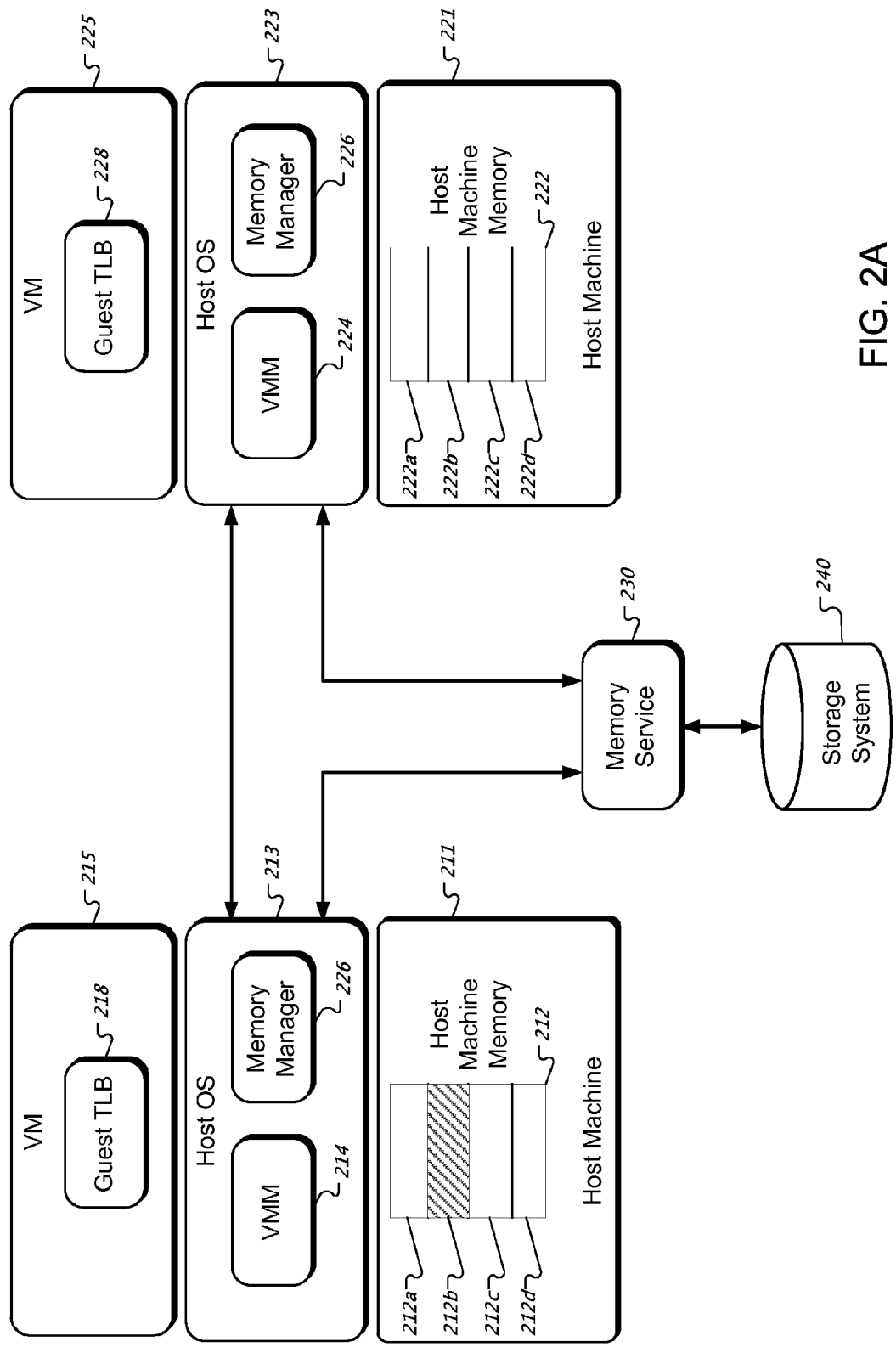
FIG. 2A illustrates management of virtual machine memory pages.

FIG. 2A illustrates management of virtual machine memory pages. A memory service 230 manages virtual machine memory pages in the system by identifying guest physical memory pages that can be coalesced into a single guest physical memory page. Coalescing two or more pages of memory means maintaining a single copy of the contents of two or more memory pages whose contents are the same. Two host machines 211 and 221 can thus share a copy of the contents of a guest physical memory page, which can either be stored on memory or on disk of a host machine or stored in a storage system 240 accessible on a network.

In this example, host machine 211 runs a host OS 213, which runs a VMM 214 that hosts a virtual machine 215, and a memory manager 216. The memory manager 216 can be a process executing on the host machine 211, for example. In some implementations, the VMM 214 and memory manager 216 run directly on host machine 211 without a separate host OS 213.

The memory manager 216 coordinates with the memory service 230 and other host machines, e.g. host machine 221, to identify, locate, and maintain coalesced virtual machine memory pages.

The virtual machine 215 of host machine 211 accesses guest physical memory pages, which can be emulated by the VMM 214 and stored as host physical memory pages 212a-d in host machine memory 212. The host physical memory pages 212a-d can be stored either in random access memory or in other computer-readable storage, e.g. a hard disk, associated with host machine 211.

The memory manager 216 can coalesce a guest physical memory page of a particular virtual machine by storing a copy of the contents of the guest physical memory page elsewhere, for example, on disk or in local or networked computer-readable storage. For example, the contents of a guest physical memory page for virtual machine 215 can be stored on a different host machine 221, e.g. in host physical memory page 222b of memory 222. When the coalesced memory page is requested by virtual machine 215, for example, due to a page fault, the memory manager 216 can locate the requested page and load the requested page into a host physical memory page in memory 212 for access by virtual machine 215.

Host machine 221 also runs a host OS 223, which runs a VMM 224 that hosts a virtual machine 225, and a memory manager 226. The host OS 223 includes a memory manager 226 that communicates with memory service 230. The virtual machine 225 accesses guest physical memory pages, which can be stored as host physical memory pages 222a-d in memory 222.

The memory service 230 can determine that the contents of two guest physical memory pages used by virtual machine 215 and virtual machine 225 are the same. For example, the memory service 230 can determine that the contents of a guest physical memory page used by virtual machine 215 and stored in host physical memory page 212b of host machine 211 are the same as the contents of a guest physical memory page used by virtual machine 225 and stored in host physical memory page 222b of host machine 221. Two memory pages can be the same when they include the same set of computer-executable instructions, data, or both.

In some implementations, the memory service 230 determines that two memory pages are the same by hashing the contents of the memory pages and comparing the resulting hash values. If the hash values are the same, the memory service 230 can optionally do a second bitwise comparison of the two memory pages to ensure that the contents of the memory pages are the same.

After determining that the contents of the guest physical memory pages are the same, the memory service 230 can maintain a single copy of the contents of the guest physical memory pages that were previously stored in both host physical memory pages 212b and 222b. The memory service 230 can, for example, record an association between a first guest physical memory page and a location of the contents of the page, e.g. host physical memory page 222b. The memory service 230 can then instruct memory manager 216 where to find the contents of the guest physical memory page when needed by virtual machine 215. The memory service 230 can also identify memory sub-pages that are the same, and similarly deallocate storage space for and store a representative copy of the contents of duplicate sub-pages.

Memory manager 216 can deallocate storage space previously occupied by host physical memory page 212b. Deallocation of the storage space allows other memory pages to be loaded into the storage space previously occupied by host physical memory page 212b. In some implementations, the storage space savings can additionally allow more virtual machines or other non-virtual workloads to be loaded onto host machine 211 or host machine 221.

The host machine 211 includes a host translation lookaside buffer, "TLB," which maps host virtual addresses to host physical addresses. When a process executing on the host machine 211 requests access to a host virtual address, the host TLB translates the requested host virtual address to a host physical address. If the host virtual address does not exist in the host TLB, the host OS 213 can walk a set of page tables, which can be stored in host machine memory 212 or on disk, to find the corresponding host physical address.

The virtual machine 215 includes a guest TLB 218, which maps guest virtual addresses to host physical addresses. When a guest application executing on the VM 215 requests access to a guest virtual address, the guest OS of the VM 215 translates the requested guest virtual address to a guest physical address using the guest TLB 218. If the guest virtual address is not found in the guest TLB 218, the VM 215 requests a translation from the VMM 214. The VMM 214 can perform the translation to a guest physical address by a number of methods. For example, the VMM 214 can build a "shadow TLB" that translates guest virtual addresses to host physical addresses. Alternatively, the VMM 214 can also build guest-physical to host-physical page tables and then let the guest OS of the VM 215 build guest-virtual to guest-physical page tables.

In the guest OS of the VM 215, if the page tables of the guest OS do not contain a mapping for a particular guest virtual address, the VMM 214 can simulate a hardware exception in the guest OS of the VM 215. This exception can trigger memory manager 216 to request the required guest physical memory page.

Similarly, if the guest-physical to host-physical page tables do not contain a mapping for a particular guest physical address, the VMM 214 can suspend guest OS execution and issue a request to memory manager 216 to retrieve the missing page. When the requested page is retrieved, the VMM 214 can then resume guest OS execution.

Memory manager 216 can request a copy of a guest physical memory page directly from host machine 221 when the memory page is needed by virtual machine 215. Alternatively, memory manager 216 can query memory service 230 for the location of the requested memory page, e.g. if host machine 220 no longer stores a copy of the guest physical memory page in its host physical memory pages, e.g. host physical memory page 222b.

In some implementations, memory service 230 provides host machine 211 with information identifying a datacenter location of a second host machine where the contents of a particular page is located. Memory service 230 can migrate the contents of a particular memory page from machine to machine in a datacenter as needed, meanwhile maintaining information about the location of the particular memory page.

In some implementations, for redundancy memory service 230 can maintain at least a certain number of copies of the contents of each page that has been coalesced in the datacenter, e.g. at least three. When memory service 230 receives a request for the coalesced page from a memory manger, the memory service 230 can provide a list of all locations where the page is stored. The memory manager 216 can then request a copy of the page from each location on the list in sequence until the page is found.

Figure 2B:
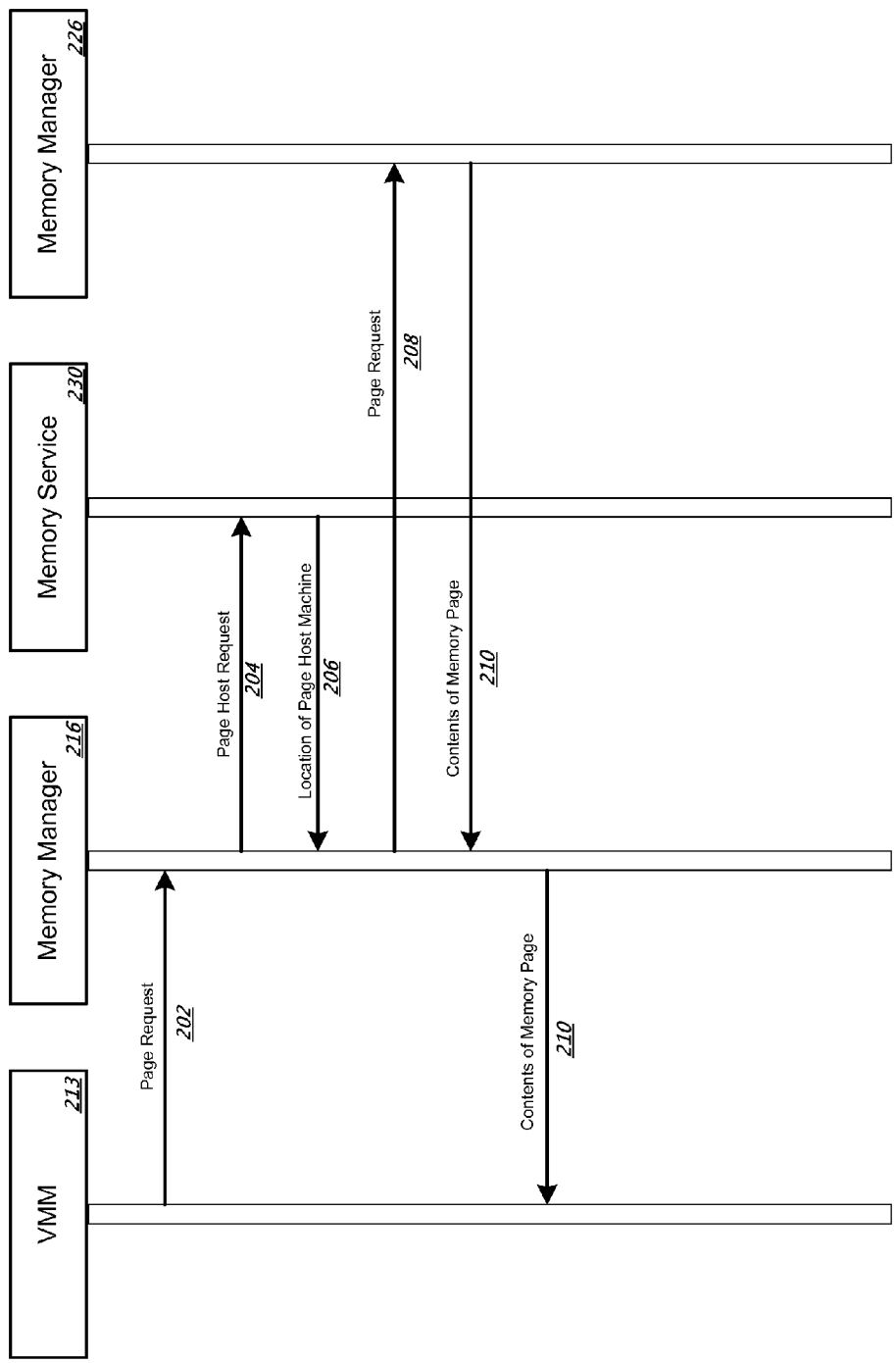
FIG. 2B is a sequence diagram of an example process for requesting a coalesced memory page.

FIG. 2B is a sequence diagram of an example process for requesting a coalesced memory page. A VMM 213 requests a memory page from memory manager 216. For example, VMM 213 can request a guest physical memory page from memory manager 216 in simulating a hardware exception in a guest OS or in response to an exception raised when a guest physical to host physical page table does not include a particular entry. Memory manager 216 communicates with memory service 230 to locate the requested memory page on another host machine. Memory manager 216 then requests a copy of the memory page directly from a memory manager 226 of the other host machine.

VMM 213 makes a page request 202 for a particular memory page. The page request 202 is a request to access a particular memory page, e.g. a request to load a particular memory page into random access memory.

The memory manager 216 receives the request 202 and determines that the requested memory page is not located on the same host machine as VMM 213. In response, the memory manager 216 makes a page host request 204 to memory service 230 to locate a host machine that is storing the requested memory page.

The memory service 230 receives the page host request 204 and determines on which host machine the requested memory page is stored. The memory service 230 provides information identifying the location 206 of the host machine to memory manager 216.

The memory manager 216 then makes a page request 208 to the memory manager 226 running on the host machine that is storing the requested memory page. The memory service 230 and second memory manager 226 may be running on the same or on different host machines.

Figure 3:
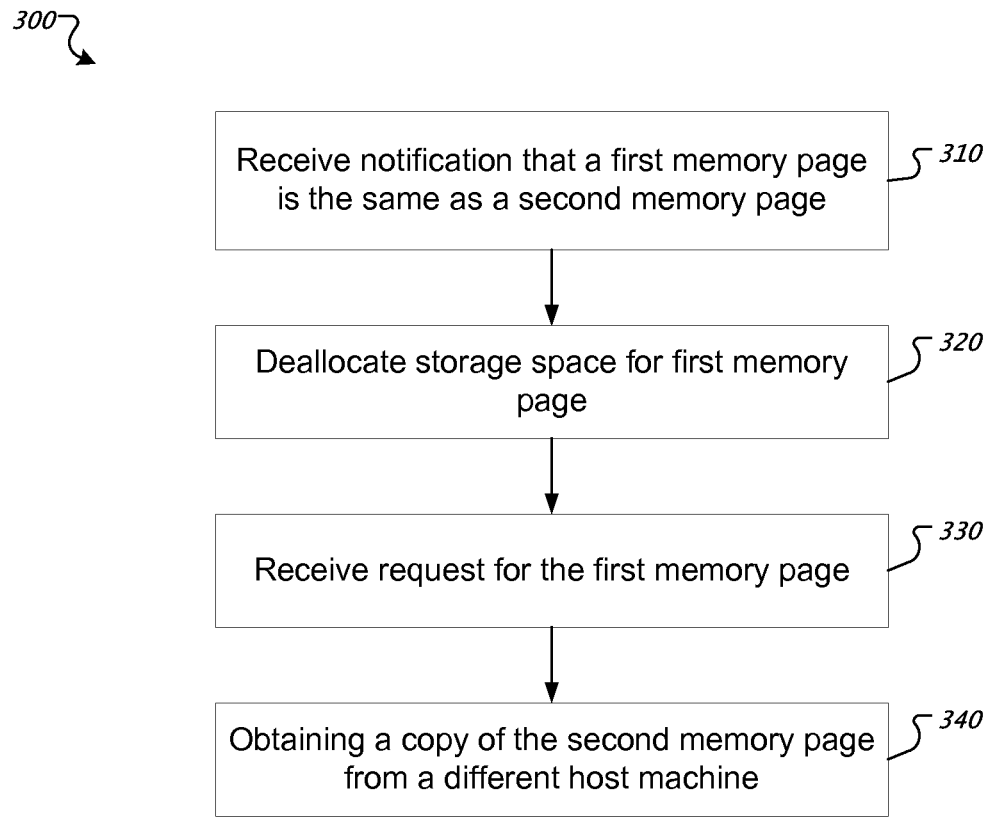
FIG. 3 is a flow chart of an example process 300 for coalescing memory pages in a datacenter.

The memory manager 226 responds with a copy of the contents of the requested memory page 210. The memory manager 216 then provides the copy of the contents of the memory page 210 to the VMM 213. The VMM 213 can then load the contents of the memory page into a page of guest physical memory, e.g. by loading the page into random access memory FIG. 3 is a flow chart of an example process 300 for coalescing memory pages in a datacenter. The process 300 can be performed by an appropriately programmed computer system of one or more computers. The process 300 will be described as being performed by a memory manager, e.g. memory manager 216 as shown in FIG. 2A, installed on a particular host machine in a datacenter of multiple host machines.

The memory manager receives a notification that a first memory page is the same as a second memory page (310). For example, the memory manager can receive a notification that a first guest physical memory page used by a first virtual machine on a first host machine has the same contents as a second guest physical memory page used by a second virtual machine on a second different host machine. The memory manager can receive the notification from a memory service that has analyzed memory page usage in a datacenter.

The memory manager deallocates storage space for the first memory page (320). For example, the memory manager can deallocate a particular host physical memory page that stored the contents of a guest physical memory page. Deallocating storage space occupied by a guest physical memory page can allow other pages of memory to be loaded into host physical memory pages The memory manager receives a request for the first memory page (330). For example, a virtual machine can request a guest physical memory page. If the contents of the requested guest physical memory page are not stored in a host physical memory page on the same host machine, a VMM can ask the memory manager to request the contents of the guest physical memory page from another host machine.

The memory manager obtains a copy of the contents of the second memory page from a different host machine (340). The memory manager can request a copy of the contents of the second memory page directly from another host machine, or the memory manager can query a memory service to locate a host machine on which the contents of the second memory page are stored.

After determining where the second memory page is located, the memory manager can request a copy of the second memory page and provide the copy of the second memory page to the virtual machine that requested the copy. For example, the memory manager can load the copy of the second memory page into random access memory and notify the virtual machine monitor that the second memory page is available for access by the virtual machine.

Figure 4:
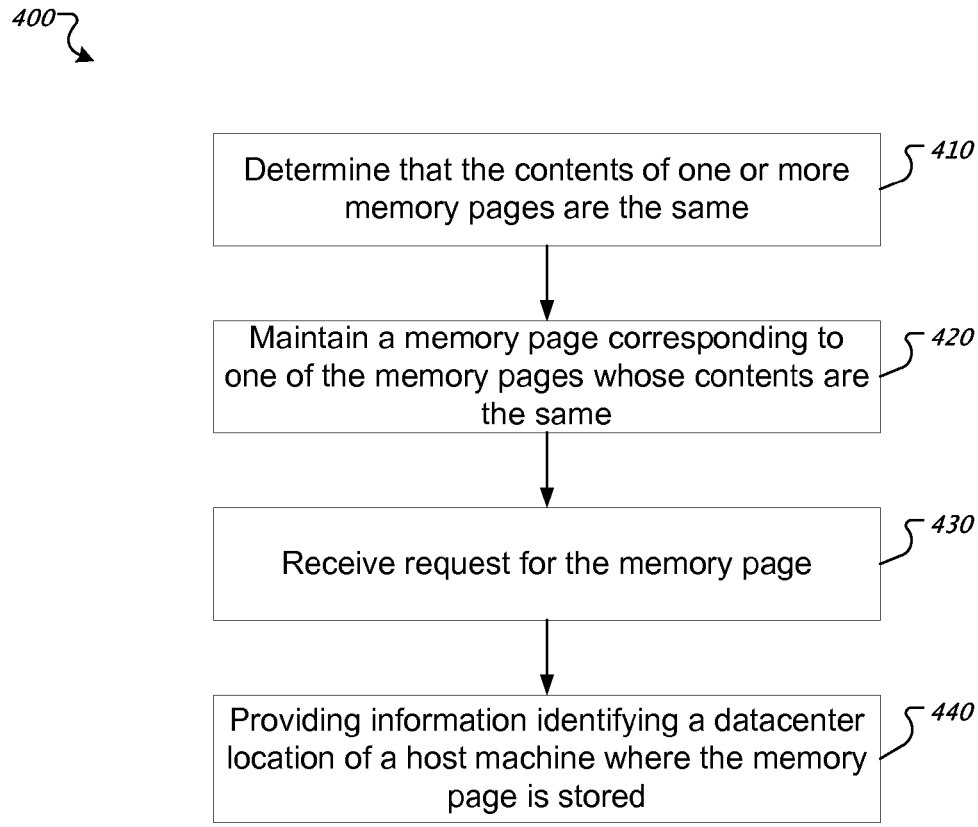
FIG. 4 is a flow chart of an example process 400 for coalescing memory pages in a datacenter.

FIG. 4 is a flow chart of an example process 400 for coalescing memory pages in a datacenter. The process 400 can be performed by an appropriately-programmed computer system of one or more computers. The process 400 will be described as being performed by a memory service, e.g.

memory service 230 as shown in FIG. 2A, installed on a particular host machine in a datacenter of multiple host machines.

The memory service determines that multiple memory pages whose contents are the same are used by multiple different virtual machines (410). For example, the memory service can compare guest physical memory pages used by virtual machines in a datacenter and determine that the virtual machines all use a guest physical memory page having the same contents.

In some implementations, the memory service identifies memory pages that are relatively rarely used, e.g. memory pages that relate to exception handling. The memory service can maintain usage statistics for pages of guest physical memory used by virtual machines in a datacenter. For example, the memory service can compute an access frequency for pages of guest physical memory and compare the access frequency to a threshold to identify rarely used pages. The memory service can also rank memory pages by usage statistics and identify a number of pages with the lowest usage statistics to be coalesced, for example, the bottom 10%. In some implementations, the memory managers installed on individual host machines can maintain usage statistics about memory pages used by virtual machines on that host machine. The memory service can then query the memory managers for the collected usage statistics and aggregate usage statistics for common memory pages in order to identify memory pages that are rarely used.

The memory service maintains a memory page corresponding to the one or more same memory pages (420). The memory service can for example designate a particular host physical memory page of a single host machine as the memory page that the virtual machines will use to access contents of the guest physical memory page. The memory service can also maintain multiple copies of the page on different host machines for redundancy and reliability. Alternatively, the memory service can store a copy of the contents of the memory page in computer-readable storage that can be provided to virtual machines upon request. The memory page can be stored in a compressed form to save storage space, and the memory service or the VMM can decompress the page into its original form when needed.

The memory service receives a request for the memory page (430). In response to the request, the memory service can provide information identifying the datacenter location of a host machine where the memory page is stored (440). For example, the memory service can provide a network address, e.g. an Internet Protocol address, of a host machine where the memory page is stored. Alternatively, the memory service can provide its own maintained copy of the page in computer-readable storage.

The memory service can, for example, maintain a database of associations between particular memory pages and host machines where they are stored. When a request is received for a particular memory page, the memory service can look up information about a host machine where the memory page is located and provide the information in response to the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a notification that contents of a first memory page for a first virtual machine on a first host machine are the same as contents of a second memory page for a second virtual machine on a second different host machine, wherein a memory page is a segment of computer-executable instructions or data;
   deallocating storage space occupied by the first memory page on the first host machine in response to receiving the notification;
   receiving a request from the first virtual machine for the first memory page; and
   in response to the request, obtaining a copy of contents of the second memory page from the second host machine.

2. The method of claim 1, wherein the first memory page and the second memory page are guest physical memory pages.

3. The method of claim 1, wherein receiving the notification comprises receiving the notification from a service that manages virtual machine memory pages in a datacenter.

4. The method of claim 1, further comprising:
   receiving an identification of the second host machine, and wherein obtaining a copy of contents of the second memory page from the second host machine comprises requesting the copy from the second host machine based on the identification.

5. The method of claim 1, further comprising:
   in response to obtaining a copy of the second memory page, loading the second memory page into random access memory of the first host machine.

6. The method of claim 1, further comprising:
   providing a notification to a virtual machine monitor on the first host machine that the second memory page is available for access by the first virtual machine.

7. The method of claim 1, further comprising:
   computing usage statistics for one or more virtual machine memory pages used by one or more virtual machines on the first host machine; and
   identifying one or more virtual machine memory pages with usage that is less than a threshold based at least in part on the computed usage statistics.

8. The method of claim 6, further comprising:
   receiving a request for usage statistics on one or more virtual machine memory pages; and providing usage statistics for the identified one or more virtual machine memory pages in response to the request.

9. A computer-implemented method comprising:
determining that multiple memory pages whose contents are the same are used by multiple different virtual machines that are each hosted by a different respective host machine of a plurality of host machines;
storing, by a first host machine, contents of a memory page from one of the multiple memory pages whose contents are the same;
receiving, from a different second host machine that previously deallocated memory space storing the contents of the memory page, a request for location information of the stored contents of the memory page; and
providing, to the second host machine in response to the request, location information identifying a location of the contents of the memory page stored by the first host machine.

10. The method of claim 9, further comprising:
computing usage statistics for virtual machine memory pages used by one or more virtual machines in a datacenter; and
determining that the multiple memory pages whose contents are the same each have a usage statistic that satisfies a threshold.

11. The method of claim 9, further comprising:
providing a notification to each of the plurality of host machines that the respective one or more memory pages can be deallocated.

12. The method of claim 9, further comprising:
storing multiple copies of the contents of the memory page, wherein each copy of the multiple copies is maintained on a different host machine.

13. A system comprising:
one or more computers and one or more storage devices storing instructions that are operable, when executed by the one or more computers, to cause the one or more computers to perform operations comprising:
receiving a notification that contents of a first memory page for a first virtual machine on a first host machine are the same as contents of a second memory page for a second virtual machine on a second different host machine, wherein a memory page is a segment of computer-executable instructions or data;
deallocating storage space occupied by the first memory page on the first host machine in response to receiving the notification;
receiving a request from the first virtual machine for the first memory page; and
in response to the request, obtaining a copy of contents of the second memory page from the second host machine.

14. The system of claim 13, wherein the first memory page and the second memory page are guest physical memory pages.

15. The system of claim 13, wherein receiving the notification comprises receiving the notification from a service that manages virtual machine memory pages in a datacenter.

16. The system of claim 13, wherein the operations further comprise:
receiving an identification of the second host machine, and wherein obtaining a copy of contents of the second memory page from the second host machine comprises requesting the copy from the second host machine based on the identification.

17. The system of claim 13, wherein the operations further comprise:
in response to obtaining a copy of the second memory page, loading the second memory page into random access memory of the first host machine.

18. The system of claim 13, wherein the operations further comprise:
providing a notification to a virtual machine monitor on the first host machine that the second memory page is available for access by the first virtual machine.

19. A system comprising:
one or more computers and one or more storage devices storing instructions that are operable, when executed by the one or more computers, to cause the one or more computers to perform operations comprising:
determining that multiple memory pages whose contents are the same are used by multiple different virtual machines that are each hosted by a different respective host machine of a plurality of host machines;
storing, by a first host machine, contents of a memory page from one of the multiple memory pages whose contents are the same;
receiving, from a different second host machine that previously deallocated memory space storing the contents of the memory page, a request for location information of the stored contents of the memory page; and
providing, to the second host machine in response to the request, location information identifying a location of the contents of the memory page stored by the first host machine.

20. The system of claim 19, wherein the operations further comprise:
computing usage statistics for virtual machine memory pages used by one or more virtual machines in a datacenter; and
determining that the multiple memory pages whose contents are the same each have a usage statistic that satisfies a threshold.

21. The system of claim 19, wherein the operations further comprise:
providing a notification to each of the plurality of host machines that the respective one or more memory pages can be deallocated.

22. The method of claim 9, further comprising:
receiving, by the second host machine from a second virtual machine hosted by the second host machine, a request to access data or instructions in the contents of the memory page;
obtaining, by the second host machine, the contents of the memory page using the location information;
loading the contents of the memory page into memory of the second host machine; and
providing, to the second virtual machine, an indication that the data or instructions are available for access by the second virtual machine.

23. The system of claim 19, wherein the operations further comprise:
receiving, by the second host machine from a second virtual machine hosted by the second host machine, a request to access data or instructions in the contents of the memory page;
obtaining, by the second host machine, the contents of the memory page using the location information;
loading the contents of the memory page into memory of the second host machine; and
providing, to the second virtual machine, an indication that the data or instructions are available for access by the second virtual machine.

24. The method of claim 1, wherein deallocating storage space occupied by the first memory page on the first host machine in response to receiving the notification comprises deallocating disk space and random access memory space allocated to the first memory page on the first host machine.

25. The system of claim 13, wherein deallocating storage space occupied by the first memory page on the first host machine in response to receiving the notification comprises deallocating disk space and random access memory space allocated to the first memory page on the first host machine.

* * * * *